United States Patent [19]

Aline et al.

[11] Patent Number: 5,050,845
[45] Date of Patent: Sep. 24, 1991

[54] PNEUMATIC LIFT FOR TRAILERS

[76] Inventors: Scott M. Aline, 43 Hallock Ave., Smithtown, N.Y. 11787; Theodore A. Riedlinger, 64 Hillside Ave., St. James, N.Y. 11780

[21] Appl. No.: 533,850

[22] Filed: Jun. 6, 1990

[51] Int. Cl.⁵ ............................................. B60S 9/06
[52] U.S. Cl. ................................................ 254/419
[58] Field of Search ............... 254/419, 423, 424, 425; 280/763-766, 475

[56] References Cited

U.S. PATENT DOCUMENTS

| | | | |
|---|---|---|---|
| 2,977,094 | 3/1961 | McKay | 254/419 |
| 3,064,943 | 11/1962 | Shrum | 254/419 |
| 3,177,664 | 4/1965 | Konkle | 60/51 |
| 3,214,137 | 10/1965 | Reichert et al. | 254/86 |
| 3,874,696 | 4/1975 | Gardner et al. | 280/150.5 |
| 4,312,520 | 1/1982 | Burman | 280/765 |
| 4,466,637 | 8/1984 | Nelson | 254/419 |

*Primary Examiner*—Robert C. Watson
*Attorney, Agent, or Firm*—Kenyon & Kenyon

[57] ABSTRACT

A pneumatic system for raising and lowering the landing gear of a trailer, wherein the pneumatic system includes a pneumatic motor totally supported by the landing gear. In this way, mounting of the pneumatic system is independent of trailer type or configuration. A gear shift spline assembly is provided between the speed reducer, that is coupled to the pneumatic motor, and the crank shaft that drives the landing gear's high-low gear reduction assembly. This spline assembly permits the crank shaft to axially translate and shift gear arrangements in the gear reduction assembly without separating the crank shaft from the pneumatic drive.

25 Claims, 5 Drawing Sheets

PNEUMATIC LIFT FOR TRAILERS

FIELD OF THE INVENTION

The present invention relates to landing gear equipment for trailers generally, and more particularly to a pneumatic system for automatically raising and lowering such landing gear.

BACKGROUND OF THE INVENTION

Pneumatic drives have been used to operate landing gear for trailers. These systems have been installed as original equipment and as conversion kits to convert conventional manually operated mechanisms that raise and lower the landing gear, such as hand crank mechanisms, to automatic pneumatically driven systems.

Typically, such pneumatic systems include air motor drives. The air motor drives a transmission that in turn drives the existing conventional landing gear shaft. Pressurized air can be taken from the existing brake line to drive the motor. Brake lines generally extend from the tractor to the rear wheels of the trailer. A valve is positioned between the brake line and the motor to control the rotational direction of the motor as well as to turn the motor on and off.

Generally, these pneumatic systems have been designed to be mounted to the undercarriage of the trailer body. While these designs permit the pneumatic system to be mounted to a flatbed type trailer, they are not suitable for mounting to trailers not having a flatbed, such as trailers having a cylindrical body (e.g., tankers).

Specifically, if the pneumatic motor were to be bolted to the tanker, the bolts would extend into the tanker. Among the drawbacks associated with this mounting arrangement is leakage. Obviously, leakage creates a serious hazard when the substance being transported is extremely volatile or toxic. Although welding is an alternative to mechanical fasteners, there are numerous factors that must be considered before welding the pneumatic system to the cylindrical body of a tanker.

Tankers typically are made of aluminum, a metal that generally is difficult to weld. The pneumatic motor would have to have an aluminum portion to provide metallurgical compatibility with the aluminum tanker. Further, aluminum welds preferably are made using the tungsten inert gas (TIG) process. The TIG process is not only slow and thus costly, it requires a relatively high degree of skill, thereby limiting the feasibility of field installation.

Even if the tanker was made of stainless steel, other disadvantages associated with welding remain. For example, the explosive nature of residue in the tanker must always be considered. After the tanker has been used to transport volatile substances, welding the pneumatic system directly to the tanker would be undesirable for obvious reasons. Again field installation generally would may not be feasible.

Therefore, there is a need to provide a pneumatic system having a universal mounting arrangement that can be coupled to trailers of different configuration for automatically raising and lowering the landing gear of a trailer.

It has been found that the transmission between the output shaft of the pneumatic motor and the crank shaft in known pneumatic systems also present certain disadvantages. The existing crank shaft provided with conventional landing gear is designed to axially translate within the high-low gear reducer that also is conventionally provided with the landing gear. This translation provides interchangeability between high and low gear in the crank shaft gear reducer. The abovementioned transmissions include gears directly connected to the output shaft of the pneumatic motor and the landing gear crank shaft. If the crank shaft could be translated, the gears no longer would mesh. Accordingly, this arrangement renders the crank's high-low gear reducer system inoperable.

Therefore, there is a further need to provide a pneumatic lift that does not interfere with the intended operation of the gear reducer that is provided as standard equipment with conventional landing gear.

SUMMARY OF THE INVENTION

The present invention is directed to a pneumatic lift for raising and lowering the landing gear of a trailer that avoids the problems and disadvantages of the prior art. The invention accomplishes this goal by providing landing gear with a pneumatic system for raising and lowering the landing gear, wherein the pneumatic system includes a pneumatic motor totally supported by the landing gear. The system further includes a source of pressurized air and a valve coupling the source of pressurized air to the pneumatic motor. A speed reducer couples the pneumatic motor to an arrangement for displacing the landing gear. Because the pneumatic motor is totally supported by the landing gear, the mounting of the pneumatic system is independent of trailer type or configuration.

A gear shift spline assembly is provided between the speed reducer and the crank shaft that slidably extends from the landing gear's high-low gear reduction assembly. The spline assembly includes a hub that surrounds a portion of the crank shaft and a sleeve slidably disposed in the hub and fixedly coupled to the crank shaft. The hub rotationally drives the sleeve which in turn rotationally drives the crank shaft, while the sleeve is free to axially slide in the hub. Accordingly, the crank shaft can axially slide toward or away from the gear reduction assembly to drive the high or low gear transmission therein.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
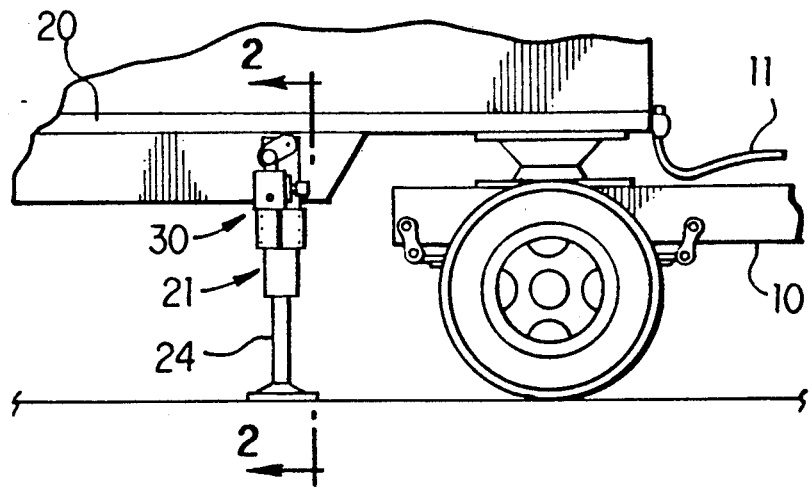
FIG. 1 is a fragmentary side elevation of the pneumatic lift in accordance with the principles of the present invention.
Figure 2:
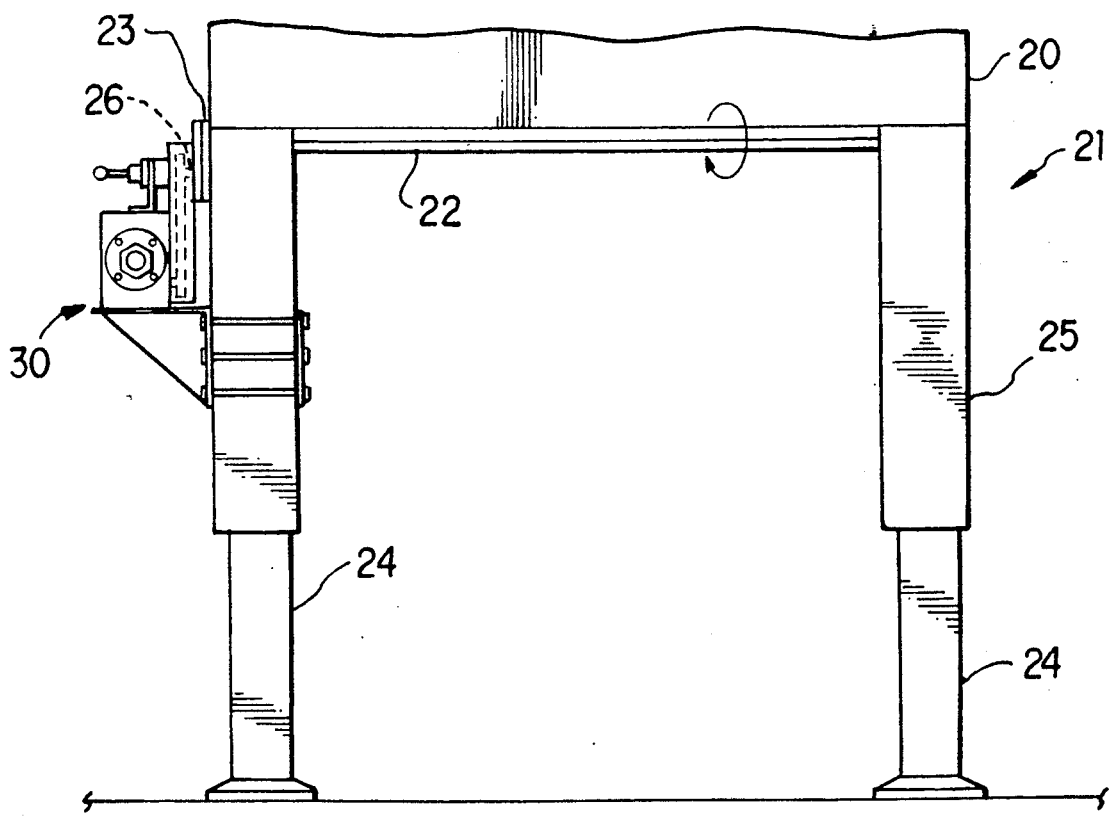
FIG. 2 is a cross-sectional view taken along cutting plane 2—2 in FIG. 1.

Referring to the drawings in detail wherein like numerals indicate like elements, pneumatic lift assembly 30 is illustrated as being mounted to landing gear 21 in accordance with the principles of the present invention.

Referring to FIG. 1, a conventional trailer 20 is illustrated as being coupled to rear portion 10 of a conventional tractor. The tractor-trailer combination is provided with an air brake system as is known in the art. Break line 11, which extends from a pneumatic system on the tractor, has a coupling which connects to break lines that extend to the rear wheels (not shown) of the trailer.

Even though it is possible to use other sources of pressurized air, pneumatic motor 31 of pneumatic lift or crank assembly 30 is preferably coupled to air line 11 through a valve, such as a four-way valve. A suitable control system for the pneumatic motor including a valve and brake line is described in U.S. Pat. No. 3,064,943 to Shrum which is hereby incorporated herein.

The valve can be mounted adjacent to pneumatic lift assembly 30 or in other convenient locations. For example, the valve can be solenoid operated so that it can be actuated by an electrical switch located in the cab of the trailer.

Landing gear 21 is conventional and is attached to trailer 20 as is known in the art. Landing gear 21 is commercially available from, for example, Holland Company, Inc. The landing gear includes tubular landing legs 25 having landing gear jacks 24 slidably disposed therein, gear reduction box 23 having a two speed gear reduction transmission (high-low), input crank shaft 26 and an output gear shaft 22 which is operatively associated with respective (screw-type) transmissions in landing legs 25 such that landing gear jacks 24 translate in synchronization.

The operation of this conventional manual landing gear lift is as follows. A crank handle (not shown) is coupled to shaft 26 through bore 27 and used to rotate crank shaft 26. When crank shaft 26 rotates, gear reduction box 23 rotates gear shaft 22 which in turn causes extension or retraction of landing gear jacks 24.

Figure 4:
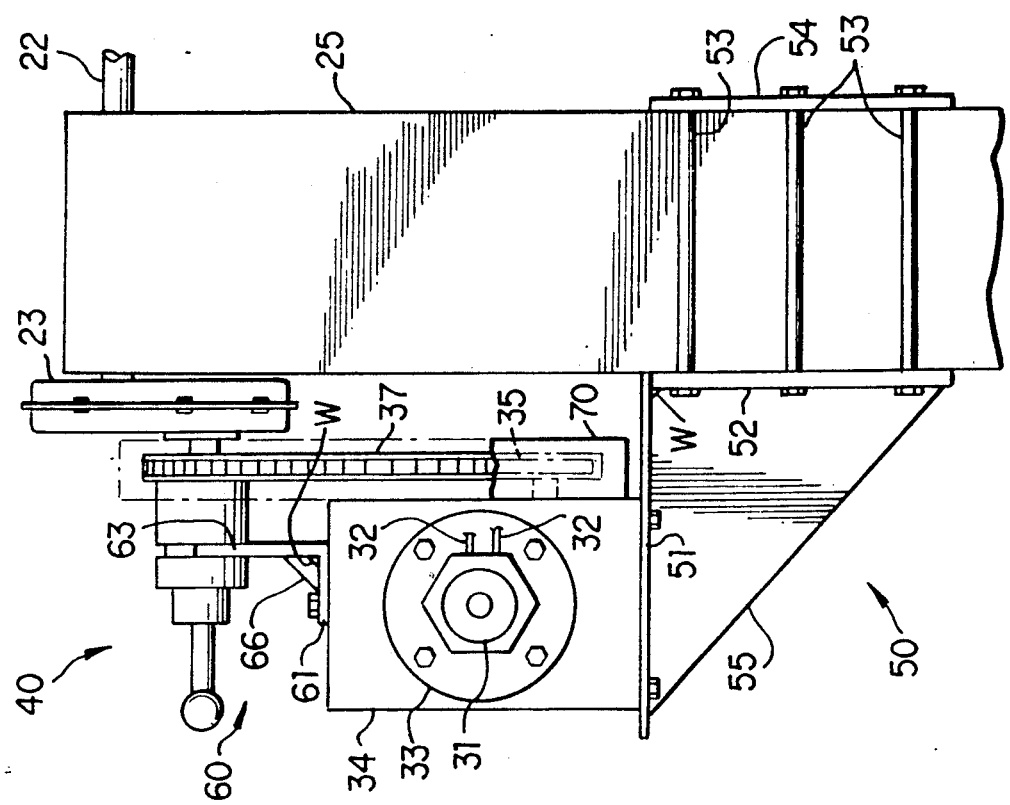
FIG. 4 is a front view of the pneumatic lift illustrated in FIG. 1.
Figure 3:
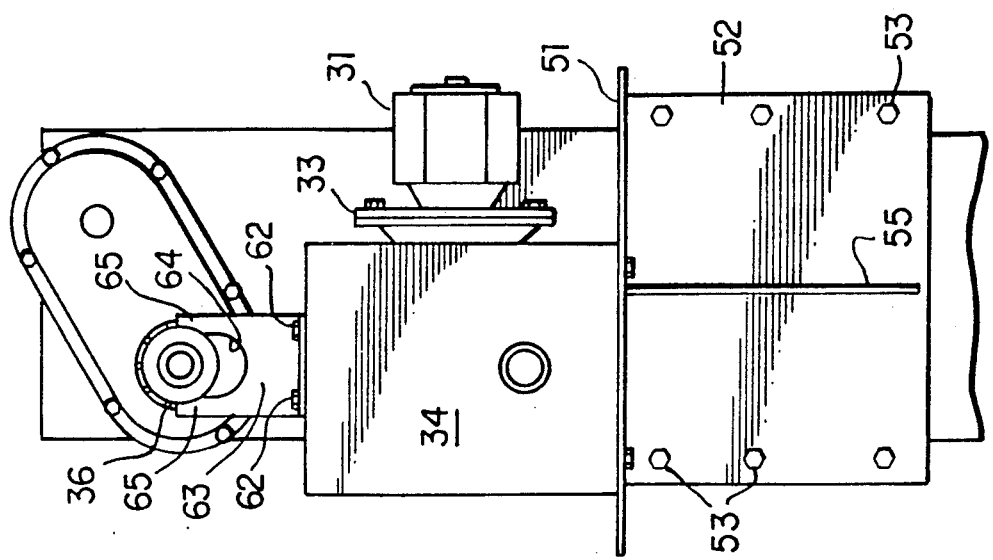
FIG. 3 is a side elevational view of the pneumatic lift illustrated in FIG. 1.

Referring to FIGS. 3 and 4 pneumatic lift assembly 30 is shown. Pneumatic lift assembly 30 includes pneumatic motor 31 which can be, for example, a Dayton 1½ horsepower air motor. Air lines 32 couple the valve described above to pneumatic motor 31. Adapter 33 couples pneumatic motor 31 to speed reducer or gearbox 34 which preferably has a 15:1 gear reduction ratio. The output shaft of gearbox 34 is coupled to sprocket 35 which is shown in phantom. Sprocket 35 is coupled to sprocket 36 through chain 37 for driving crank shaft 26. Sprockets 35 and 36 have outer diameters of the same size, thereby providing a 1:1 transmission ratio.

Figure 5:
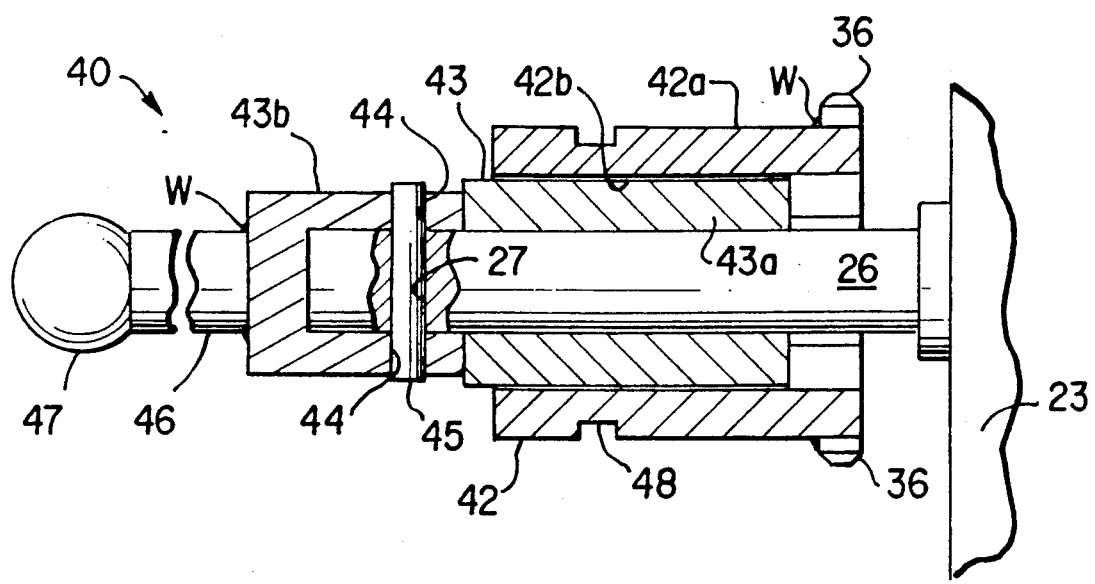
FIG. 5 is an enlarged longitudinal cross-sectional view of the gear shift spline assembly.

Spline assembly 40 couples sprocket 36 to crank shaft 26 which is part of original landing gear 21. Spline assembly 40 includes female tubing or hub 42, male tubing or sleeve 43 and coupling pin 45. Sprocket 36 is fixed to the outer surface of female tubing 42 and can be welded thereto as designated by reference character W in FIG. 5.

Female tubing 42 has a cylindrical outer surface 42a, a longitudinal inner bore 42b, preferably having a square transverse cross section, and annular groove 48 formed in outer surface 42a. Male tubing 43 includes a first portion 43a having a square configuration for cooperation with the inner surface of female tubing bore 42b. Portion 43a is sized such that its outer side surfaces sufficiently cooperate with the inner wall surfaces of bore 42b so that inner wall surfaces 42b rotatingly drive male tubing 43 with minimal slippage therebetween. Although the cooperating surfaces of inner bore 42b and tubing portion 43a are preferably square, other configurations that would permit tubing 42 to rotatingly drive tubing 43 can be used.

A cylindrical bore is formed in male tubing 43 for receiving crank shaft 26. Male tubing 43 also includes cylindrical portion 43b having a radial bore 44. As crank shaft 26 is inserted into male tubing 43 bore 44 is aligned with bore 27 in crank shaft 26. Once these bores are aligned, coupling pin 45 is inserted therethrough and secured therein to fasten male tubing 43 to crank shaft 26. The cylindrical bore of male tubing 43 is sized to provide at least a one-eighth inch clearance between crank shaft 26 and the inner surface of male tubing 43.

Shaft 46 is provided on the blind end of cylindrical portion 43b. Shaft 46 can be, for example, threadably secured or welded to cylindrical portion 43b. Ball 47 is secured to the other end of shaft 46 to provide a gripping surface for pushing or pulling shaft 46 and thus crank shaft 26 toward or away from gearbox 23.

Referring to FIG. 4, gear shift spline assembly 40 is coupled to bracket 60 which is supported by motor gearbox 34. Gearbox 34 is supported by motor mounting bracket 50 which is mounted to landing gear 21. Motor mounting bracket 50 includes horizontal plate 51 (to which motor gearbox 34 is fastened), vertical plate 52 and back plate 54. Vertical plate 52 and back plate 54 are secured to opposite sides of landing gear leg 25 by fasteners 53. For purposes of illustration only, fasteners 53 are shown as bolt and nut type fasteners which pass through holes formed through vertical plate 52 and back plate 54, but which pass along the outer surface of tubular leg 25. Gusset 55 extends between vertical plate 52 and horizontal plate 51 to further support horizontal plate 51.

Referring to FIG. 3, bracket 60 includes horizontal plate 61 secured to motor gearbox 34 through fasteners 62. Vertical plate 63 extends from horizontal plate 61. Gusset 66 can be provided between horizontal and vertical plates 61 and 63.

Vertical plate 63 includes a U-shaped notch that forms U-shaped portion 64. U-shaped portion 64 includes prongs 65 which are dimensioned to extend into annular groove 48 in gear shift spline assembly 40. Accordingly, bracket 60 prevents female tubing 42 from axial translation. Specifically, when ball 47 is pushed toward crank gear reduction box 23, hub 42 and sprocket 36 remain fixed in the axial direction, while male tubing 43 together with crank shaft 26 axially translate toward gearbox 23. In this way, crank shaft 26 can be translated from a first position to a second position to shift the transmission in crank gearbox 23 from high to low gear or from low to high gear.

Crank gearboxes which are conventionally provided with landing gear typically have high and low gear positions, wherein low gear provides about a 6:1 gear reduction ratio. The automatic pneumatic crank described above can lift up to sixteen thousand pounds at the nose of the trailer in low gear. However, when it is only necessary to put the legs up or down without lifting a load, the automatic crank when in high gear can raise the trailer in 30 seconds.

The pneumatic crank can be completely enclosed in a weather-proof housing having a door or opening to provide access thereto. Alternatively, the housing can be configured to enclose only the chain, sprockets and components immediately associated therewith as illustrated by reference numeral 70. In either case, the housing preferably should be 16 gauge steel to maintain the weight of the lift at a minimum.

The operation of the pneumatic lift is as follows. Receiving power from the trailer's existing brake line, the output shaft of air motor 31 turns at about 1800RPM. This rotational speed is reduced by motor gearbox 34 which has, for example, a 15:1 gear reduction ratio. The output shaft of gearbox 34 turns sprocket 36 through sprocket 35 and chain 37. Sprocket 36 turns female tubing 42 which turns male tubing 43. Male tubing 43 turns crank shaft 26 through coupling pin 45. Because sprockets 35, 36 are substantially the same size, crank shaft 26 turns at about the same speed as the output shaft of gearbox 34. Travel up or down is controlled by the four-way valve described above.

In case of breakdown pin 45 can be removed and male tubing 43 slid off crank shaft 26. Then, the originally supplied crank handle can be coupled to crank shaft 26 through coupling pin 45 to enable manual raising and lowering of the landing gear.

Figure 6:
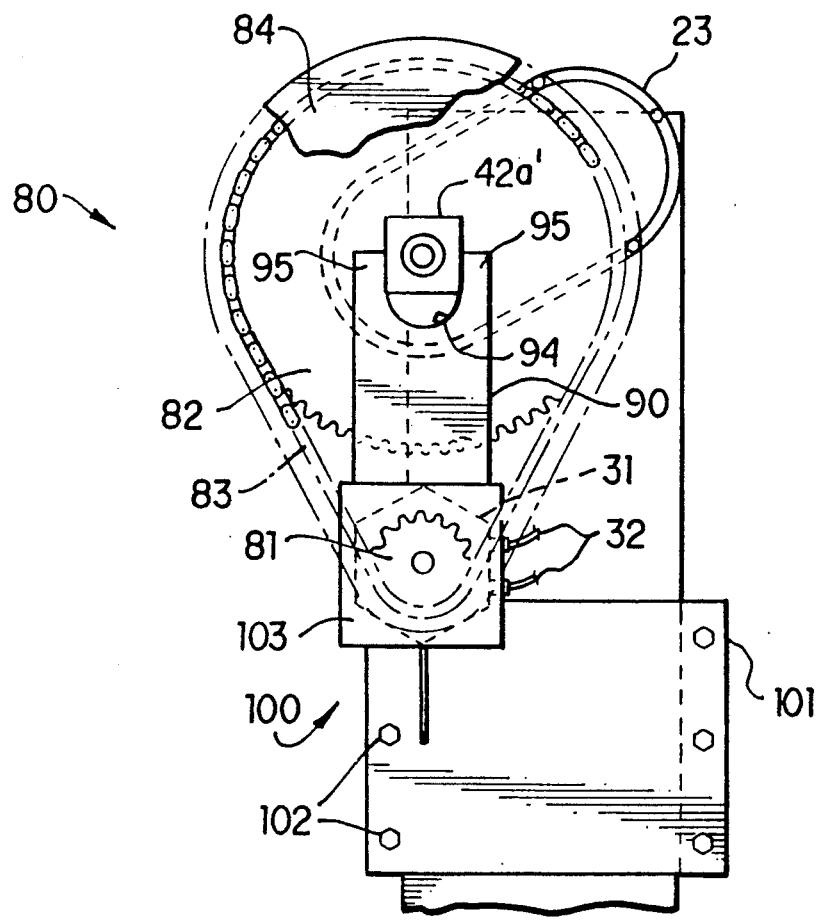
FIG. 6 is a side elevational view of another embodiment of the pneumatic lift.

Referring to FIG. 6, a further embodiment of the present invention is illustrated. This embodiment essentially differs from the embodiment illustrated in FIGS. 3 and 4 in that pneumatic lift or crank assembly 80 depicted in FIG. 6 lacks a motor gearbox type speed reducer for heavy lifting. To sufficiently reduce the rotational speed of the motor delivered to crank shaft 26 for lighter loads, sprocket 82, which is coupled to gear shift spline assembly 40, has an outer diameter that is substantially larger than the outer diameter of sprocket 82, which is coupled to the output shaft of pneumatic motor 31. Chain 83 provides transmission between sprockets 81 and 82, and gear shift spline assembly 40 provides transmission between sprocket 82 and crank shaft 26 as described above.

Although different outer diameter ratios can be used, it has been found that a 6:1 ratio provides enough speed reduction to produce enough power to raise or lower a trailer that is not fully loaded. Further, the outer diameter of sprocket 82 is limited by the space available in the vicinity of landing gear 21 underneath trailer 20. It has been found that an outer diameter of 12 inches for sprocket 82 and an outer diameter of 2 inches for sprocket 81 optimize torque, speed reduction and space.

Further, tubing 42 is illustrated as having substantially square outer surface 42a' for fitting in a similarly configured hole in sprocket 82. Although cylindrical configurations can be used, the substantially square configurations clearly provide increased coupling strength between the gear shift spline assembly and sprocket 82. Accordingly, the substantially square configurations are preferred in this embodiment due to relatively large size of sprocket 83.

Bracket 90 is similar to bracket 60 in configuration, but differs in vertical dimension to accommodate the additional distance between pneumatic motor 31 and gear shift spline assembly 40. This additional distance results from the increased size of sprocket 81 relative to sprocket 36. Accordingly, bracket 90 includes U-shaped portion 94 having prongs 95 extending therefrom for engagement with annular groove 48 that is formed in hub or female tubing 42.

Referring to FIG. 6 pneumatic motor 31 is mounted to landing gear 21 via mounting bracket 100. Mounting bracket 100 includes mounting plate 100 which can be mounted to landing gear 21 through fasteners 102 in the same way as vertical plate 52 is mounted to landing gear 21 as described above and illustrated in FIG. 4. L-shaped bracket 103 is coupled to mounting plate 101 such that when the blind end of pneumatic motor 31 is coupled to mounting plate 101, the shaft end of pneumatic motor 31 can be supported in a U-shaped notch formed in L-shaped bracket 103. Shroud or cover 84 provides a weatherproof housing for the pneumatic lift illustrated in FIG. 6.

Figure 8:
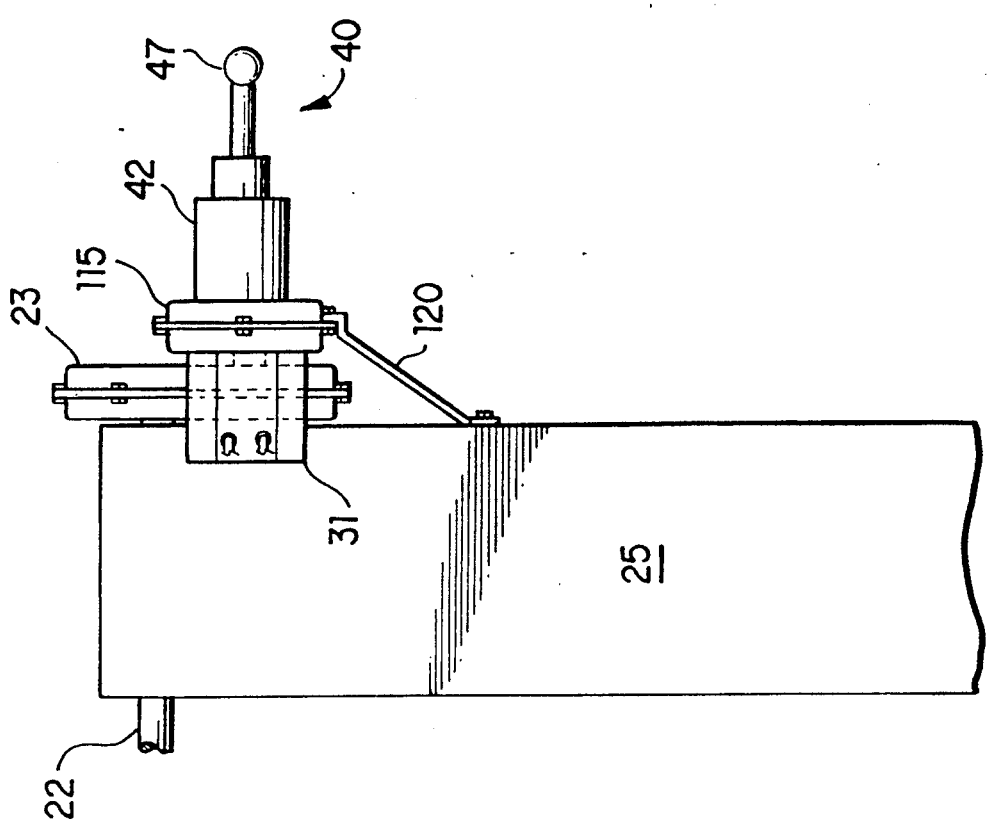
FIG. 8 is a front elevational view of the pneumatic lift illustrated in FIG. 7.
Figure 7:
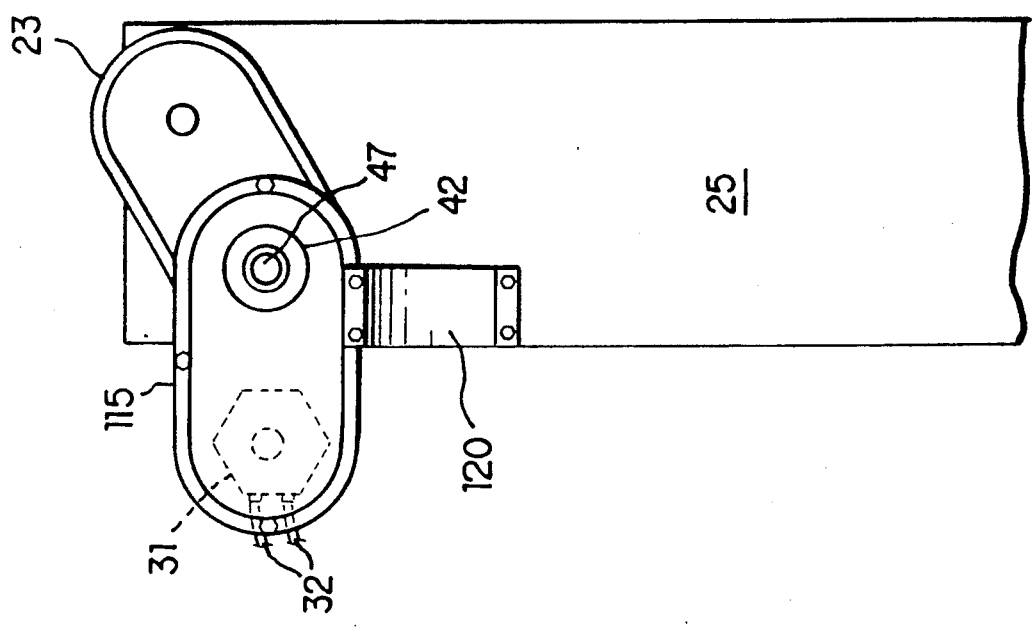
FIG. 7 is a side elevational view of a further embodiment of the pneumatic lift.
Figure 9:
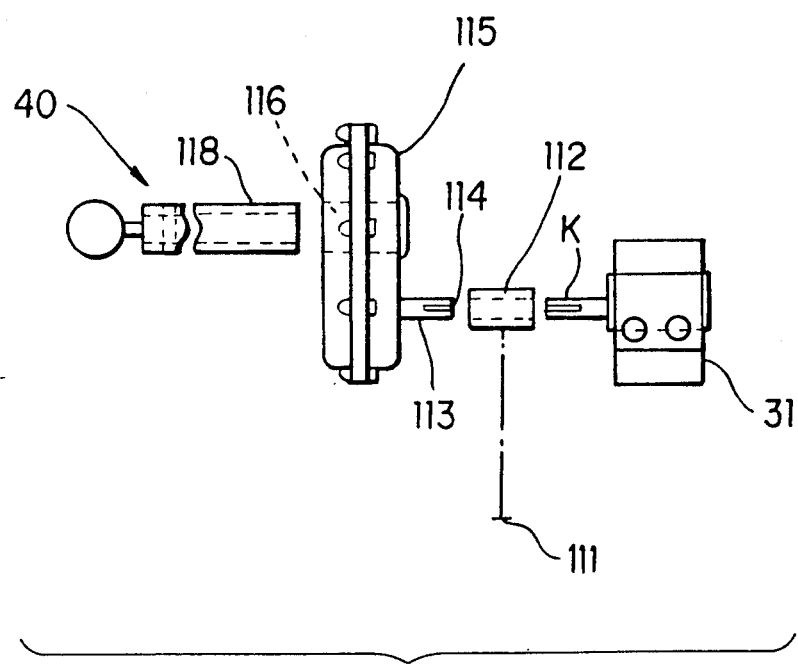
FIG. 9 is an exploded view of the pneumatic lift illustrated in FIGS. 7 and 8.

A further embodiment of the pneumatic lift or crank assembly is illustrated in FIGS. 7, 8 and 9. This embodiment essentially differs from the embodiments depicted in FIGS. 3, 4 and 6 in that pneumatic lift assembly 110 incorporates a gear drive in lieu of the chain and sprocket transmission.

Pneumatic lift assembly 110 incorporates Morse-type gear-box 115 which is commercially available and can provide a 15:1 speed reduction ratio. Referring to FIG. 9, pneumatic motor 31 is coupled to input shaft 113 of gearbox 115 through adapter bushing 111. Adapter bushing 111 includes longitudinal key 112 which cooperates with keyway K formed in the output shaft of pneumatic motor 31 and keyway 114 which is formed in input shaft 113 of Morse gearbox 115.

The output portion of Morse gearbox 115 comprises hole 116 having key 117 axially positioned therein. Keyway 118 is formed in the outside surface of female spline or hub 42 to cooperate with key 117. Accordingly, as pneumatic motor 31 drives the pinion in gearbox 115, key 117 turns female tubing 42 which in turn turns crank shaft 26.

Bracket 120 is illustrated with one end secured to landing leg 25 and the other end secured to gear box 115. Accordingly, bracket 120 provides lift assembly 110 with additional support.

As evident from the above description, pneumatic lift assembly 110 is extremely compact and thus can be used in applications where minimal space is available.

The above is a detailed description of particular embodiments of the invention. It is recognized that departures from the disclosed embodiments may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. Landing gear including a gear reduction assembly in combination with a pneumatic system for raising and lowering the landing gear comprising:
   (a) a pneumatic motor totally supported by said landing gear;
   (b) a source of pressurized air;
   (c) a valve coupling said source of pressurized air to said pneumatic motor;
   (d) means for displacing said landing gear; and
   (e) a speed reducer coupling said pneumatic motor to said means for displacing the landing gear.

2. The combination of claim 1 wherein said speed reducer comprises a gearbox having a plurality of gears.

3. The combination of claim 2 wherein said gears are arranged to provide a 15:1 speed reduction ratio.

4. The combination of claim 2 wherein said gearbox includes an output shaft, a first sprocket is coupled to said output shaft, a second sprocket is coupled to said means for displacing the landing gear, and a chain is operatively associated with said sprockets.

5. The combination of claim 4 wherein the outer diameter of said first sprocket is substantially the same as the outer diameter of said second sprocket.

6. The combination of claim 2 wherein said speed reducer is a Morse-type gear reduction box.

7. The combination of claim 1 wherein said speed reducer comprises first and second sprockets and a chain, said first sprocket being directly coupled to said pneumatic motor, said second sprocket being coupled to said means for displacing the landing gear, said chain being operatively associated with said sprockets.

8. The combination of claim 7 wherein the outer diameter of said second sprocket is at least three times greater than the outer diameter of said first sprocket.

9. The combination of claim 7 wherein the outer diameter of said second sprocket is about 6 times greater than the outer diameter of said first sprocket.

10. The combination of claim 1 wherein said means for displacing the landing gear comprises a gear reduction assembly having high and low gear transmission arrangements and a crank shaft operatively associated therewith and slidably extending therefrom, said speed reducer being coupled to said crank shaft.

11. The combination of claim 10 including means for changing said gear transmission from one transmission arrangement to the other transmission arrangement comprising a first axially fixed tubular member and a second tubular member slidably disposed in said first tubular member while being secured to said crank shaft, said speed reducer being coupled to said first tubular member.

12. The combination of claim 11 wherein said first tubular member has a substantially rectangular inner surface, said second tubular member has a substantially rectangular outer surface being sized to essentially entirely cooperate with the rectangular inner surface of said first tubular member.

13. The combination of claim 11 including a bracket coupled to said landing gear, said first tubular member including an annular groove formed in the outer surface thereof, said bracket having a U-shaped portion extending into said annular groove for preventing said first tubular member from axial translation.

14. In a pneumatically crank actuated, screw jack type landing gear system including a gear reduction assembly having a crank shaft operatively associated therewith and slidably extending therefrom, and a pneumatic drive, the improvement comprising:
a sleeve surrounding a portion of said crank and being axially slidable therewith;
a hub surrounding a portion of said sleeve and being restrained from axial translation; and
a pneumatic drive being totally supported by said landing gear and coupled to said hub through a speed reducer.

15. Landing gear including a gear reduction assembly and a crank shaft operatively associated therewith and slidably extending therefrom in combination with a pneumatic system for rotating said crank shaft comprising:
(a) a pneumatic motor being totally supported by said landing gear;
(b) a source of pressurized air;
(c) a four-way valve coupling said source of pressurized air to said pneumatic motor;
(d) a hub fixedly positioned relative to said landing gear and surrounding a portion of said crank;
(e) a speed reducer having an input coupled to said pneumatic motor and an output coupled to said hub; and
(f) a tubular member axially slidably disposed in said hub and having a blind end and an open end, said crank extending into said tubular member and being secured thereto.

16. Landing gear in combination with a pneumatic system for raising and lowering the landing gear comprising:
(a) a pneumatic motor totally supported by said landing gear;
(b) a source of pressurized air;
(c) a valve coupling said source of pressurized air to said pneumatic motor;
(d) means for displacing said landing gear comprising a gear reduction assembly having high and low gear transmission arrangements and a crank shaft operatively associated therewith and slidably extending therefrom;
(e) a speed reducer coupling said pneumatic motor to said means for displacing the landing gear, said speed reducer being coupled to said crank shaft; and
(f) means for changing said gear transmission from one transmission arrangement to the other transmission arrangement comprising a first axially fixed tubular member and a second tubular member slidably disposed in said first tubular member while being secured to said crank shaft, said speed reducer being coupled to said first tubular member.

17. The combination of claim 16 wherein said speed reducer comprises a gearbox having a plurality of gears.

18. The combination of claim 17 wherein said gears are arranged to provide a 15:1 speed reduction ratio.

19. The combination of claim 17 wherein gearbox includes an output shaft, a first sprocket is coupled to said output shaft, a second sprocket is coupled to said means for displacing the landing gear, and a chain is operatively associated with said sprockets.

20. The combination of claim 19 wherein the outer diameter of said first sprocket is substantially the same as the outer diameter of said second sprocket.

21. The combination of claim 16 wherein said speed reducer comprises first and second sprockets and a chain, said first sprocket being directly coupled to said pneumatic motor, said second sprocket being coupled to said means for displacing the landing gear, said chain operatively associated with said sprockets.

22. The combination of claim 21 wherein the outer diameter of said second sprocket is at least three times greater than the outer diameter of said first sprocket.

23. The combination of claim 21 wherein the outer diameter of said second sprocket is about 6 times greater than the outer diameter of said first sprocket.

24. The combination of claim 16 wherein said first tubular member has a substantially rectangular inner surface, said second tubular member has a substantially rectangular outer surface being sized to essentially entirely cooperate with the rectangular inner surface of said first tubular member.

25. The combination of claim 16 including a bracket coupled to said landing gear, said first tubular member including an annular groove formed in the outer surface thereof, said bracket having a U-shaped portion extending into said annular groove for preventing said first tubular member from axial translation.

* * * * *

UNITED STATES PATENT AND TRADEMARK OFFICE
CERTIFICATE OF CORRECTION

PATENT NO. : 5,050,845

DATED : September 24, 1991

INVENTOR(S) : Scott M. Aline, et al

It is certified that error appears in the above-identified patent and that said Letters Patent is hereby corrected as shown below:

| Column | Line | |
|--------|------|---|
| 1 | 50 | After "tanker" change "was" to --were--. |
| 3 | 14 | Change "break" to --brake--. |

Signed and Sealed this

Twentieth Day of April, 1993

Attest:

MICHAEL K. KIRK

*Attesting Officer*     *Acting Commissioner of Patents and Trademarks*